United States Patent
Woodward et al.

(10) Patent No.: US 6,194,017 B1
(45) Date of Patent: Feb. 27, 2001

(54) DOUGH PUNCH AND METHOD OF USE

(75) Inventors: Steven J. Woodward, McKinney; James E. Mabe, Jr., Plano; Malcolm F. Dyer, Addison, all of TX (US)

(73) Assignee: Pizza Hut, Inc., Dallas, TX (US)

( * ) Notice: Subject to any disclaimer, the term of this patent is extended or adjusted under 35 U.S.C. 154(b) by 0 days.

(21) Appl. No.: 08/782,241

(22) Filed: Jan. 14, 1997

Related U.S. Application Data

(60) Provisional application No. 60/010,036, filed on Jan. 16, 1996.

(51) Int. Cl.[7] ................................................. A21D 13/00
(52) U.S. Cl. ...................... 426/503; 426/502; 425/290; 99/331; 99/352; 99/372; 99/377; 99/380
(58) Field of Search .................................. 426/203, 502; 425/290; 99/372, 331, 352, 380, 377

(56) References Cited

U.S. PATENT DOCUMENTS

| 1,790,194 | * | 1/1931 | Amacher | 99/379 |
|---|---|---|---|---|
| 1,915,962 | * | 6/1933 | Vaughn | 144/250.24 |
| 3,016,847 | * | 1/1962 | Galloway | 425/290 |
| 3,379,139 | | 4/1968 | Lipinsky | 99/450.6 |
| 3,736,859 | * | 6/1973 | Carlson | 99/371 |
| 3,864,071 | | 2/1975 | La Monica | 425/470 |
| 4,159,349 | | 6/1979 | Caiello | 426/94 |
| 4,176,591 | | 12/1979 | Power | 99/430 |
| 4,551,337 | | 11/1985 | Schmit et al. | 426/94 |
| 4,574,090 | | 3/1986 | Paulucci | 426/439 |
| 5,244,374 | * | 9/1993 | Gardner | 425/290 |
| 5,253,565 | | 10/1993 | Burton | 99/374 |
| 5,308,633 | * | 5/1994 | Gardner | 426/503 |
| 5,405,627 | | 4/1995 | Ito | 426/94 |
| 5,720,998 | * | 2/1998 | Proctor et al. | 426/94 |

FOREIGN PATENT DOCUMENTS

858010 * 2/1957 (GB).

* cited by examiner

Primary Examiner—Michael P. Woodward
Assistant Examiner—Mary K Zeman
(74) Attorney, Agent, or Firm—Patterson & Keough, P.A.

(57) ABSTRACT

An apparatus and method easily and quickly produce multiple holes in a dough layer. An apparatus according to the invention includes a top portion, a number of pins supported by the top portion in a fixed pattern, and a base portion having a number of holes arranged in a fixed pattern corresponding to the pins of the top portion. Structure, such as a hinge, is provided to lower the top portion toward the base portion and to guide the pins through a dough layer placed between the top portion and base portion and into the holes. A number of openings in the dough layer are thus produced. A corresponding method is also disclosed.

22 Claims, 5 Drawing Sheets

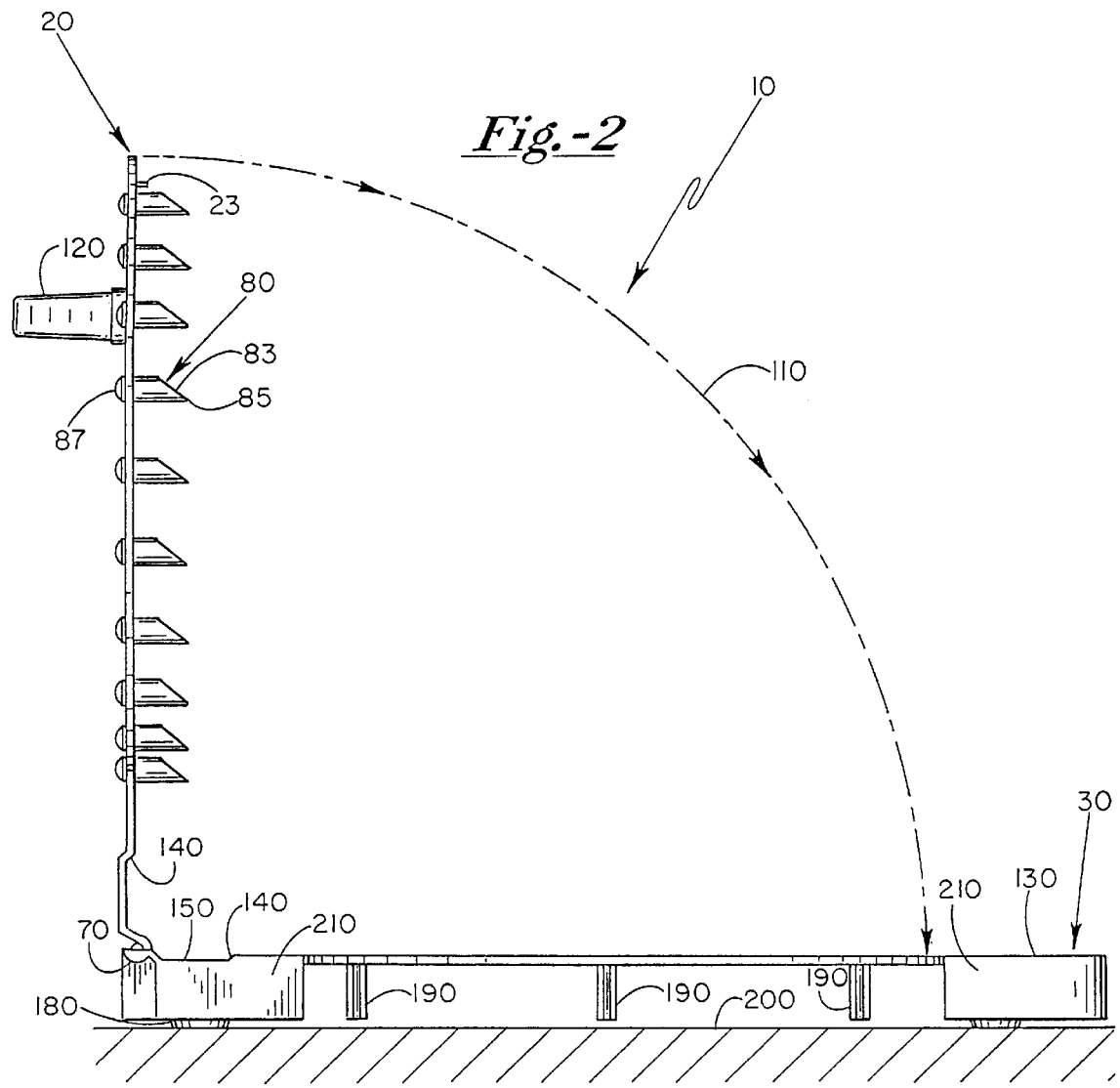

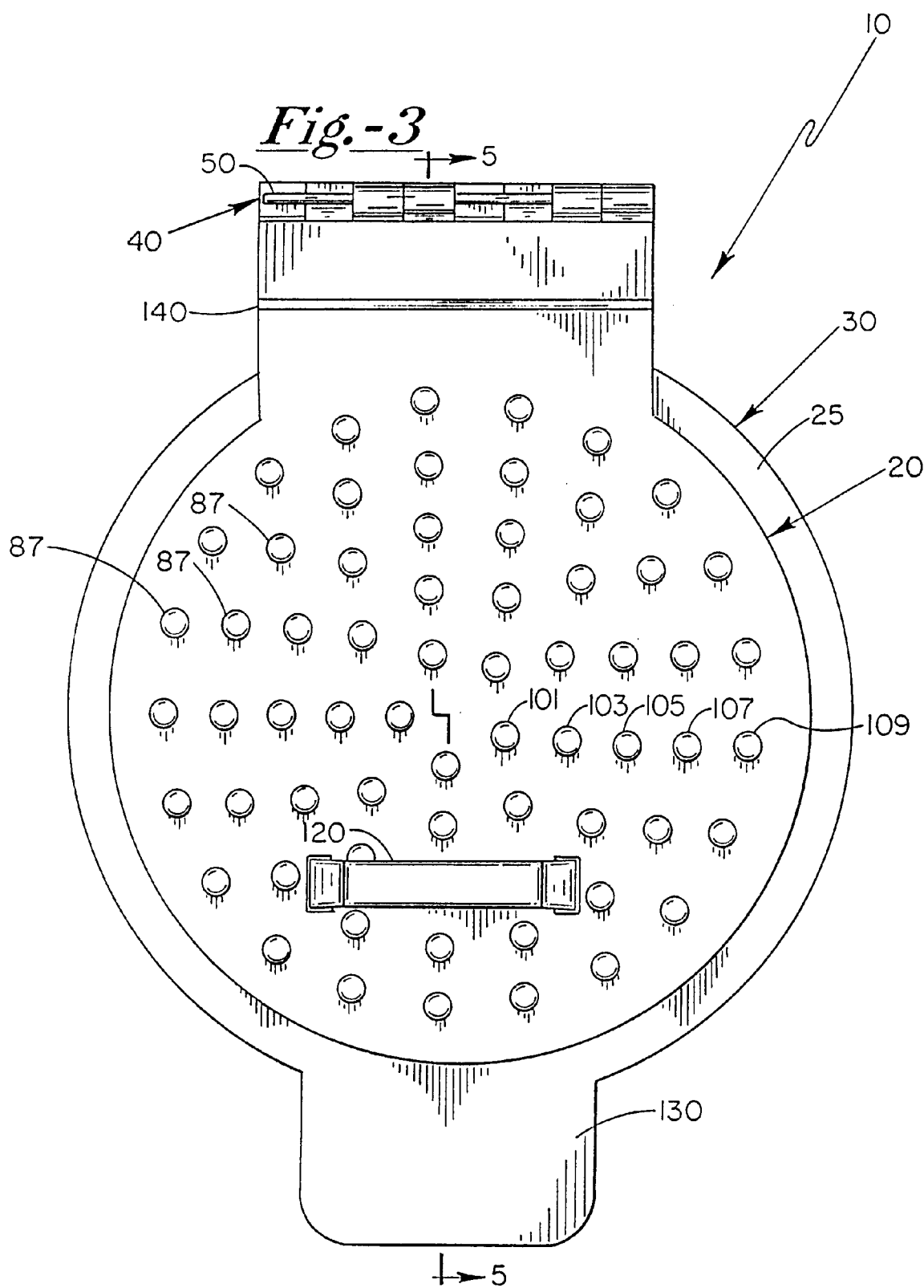

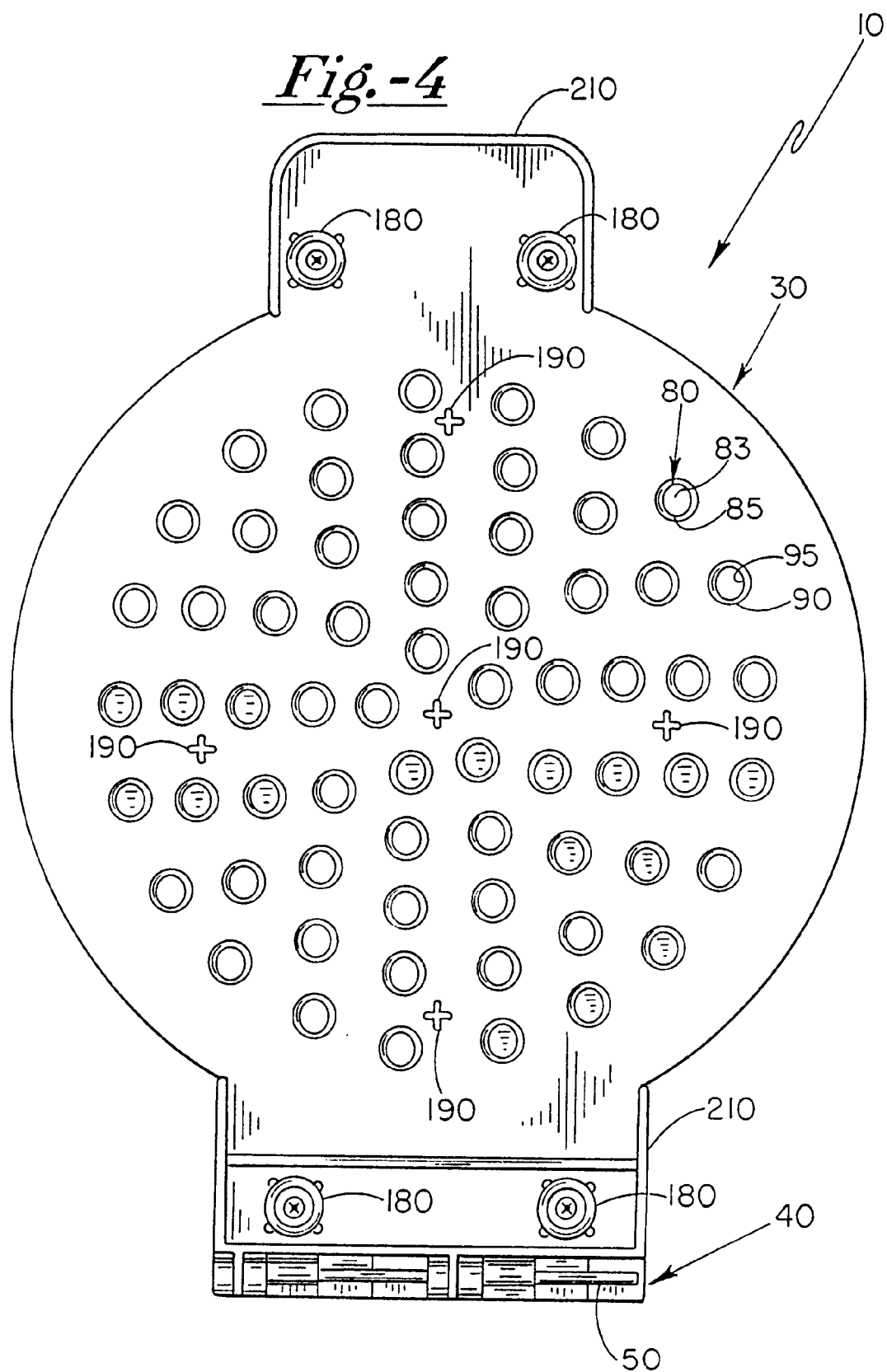

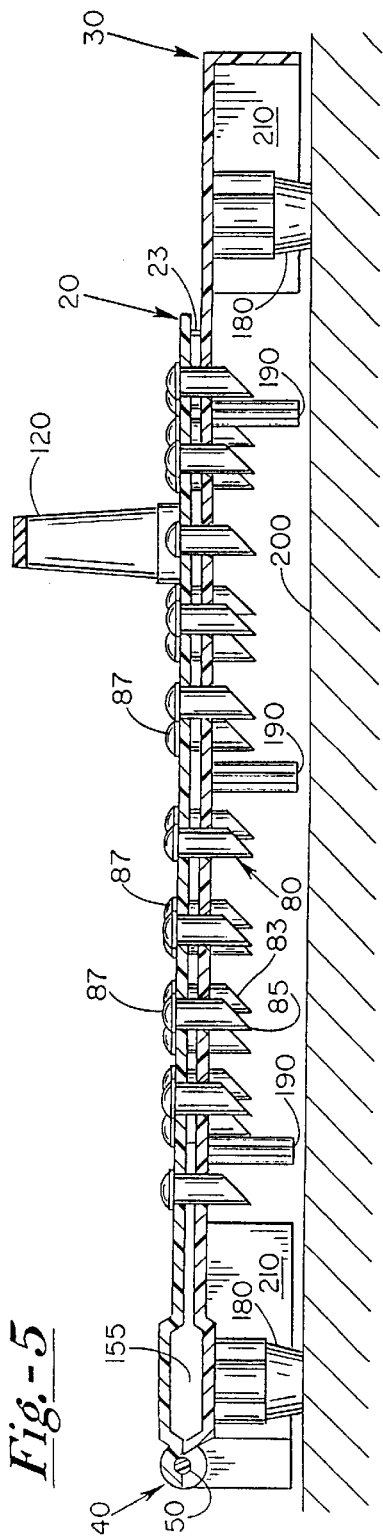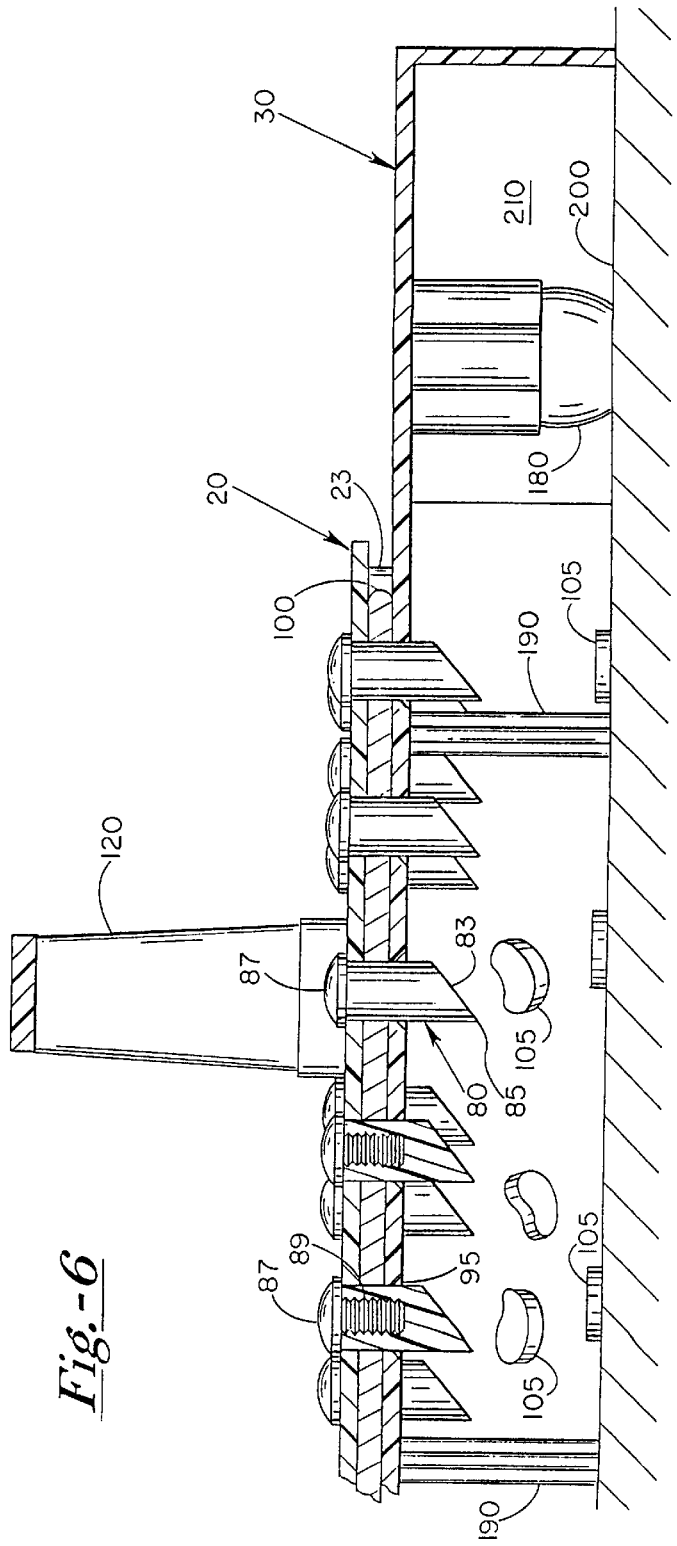

DOUGH PUNCH AND METHOD OF USE

CROSS REFERENCE TO RELATED APPLICATION

The subject matter of this application is related to the subject matter of co-pending U.S. Provisional Application No. 60/010,036 to Woodward et al., filed Jan. 16, 1996, entitled "DOUGH PUNCH AND METHOD OF USE", priority to which is claimed under 35 U.S.C. § 119(e), and which is incorporated by reference in its entirety herein, and to U.S. application Ser. No. 08/587,912 to Proctor et al., filed Jan. 16, 1996, entitled "MULTI-LAYERED PIZZA PRODUCT, AND METHOD OF MAKING", U.S. Pat. No. 5,720,998, which is incorporated by reference in its entirety herein.

BACKGROUND OF THE INVENTION

1. Field of the Invention

The invention relates to an apparatus and method for forming holes in a sheet of a soft, malleable substance, and more particularly, a dough punch for punching multiple openings in a sheet of dough, such as pizza dough.

2. Description of Related Art

The above-referenced application Ser. No. 08/587,912 (U.S. Pat. No. 5,720,998) is directed to a pizza product that includes multiple dough layers. A first dough sheet is placed into a pizza pan or similar utensil, and a food ingredient layer, such as cheese, is placed over the first dough sheet. Then, a second, top dough layer is placed over the first ingredient layer, and a second ingredient layer is placed over the second dough layer. The second ingredient layer can include cheese, sausage, pepperoni and other typical pizza toppings.

The pizza product of the above-referenced application is designed to be baked in a single, continuous baking step. No partial assembly or partial baking steps are required, resulting in significant time savings. To accomplish this, the second dough layer advantageously includes a vent opening that allows steam to escape from the first ingredient layer. According to one embodiment, the vent opening is a single aperture at a central portion of the second dough layer.

It has been found, however, that in many instances the single, central aperture fails to cause steam to escape adequately from the first ingredient layer. For example, steam is generated at a lower boiling point at high altitudes, before the second dough layer has enough time to properly set. This is a problem primarily at altitudes above 3000 feet elevation. Because steam forms earlier, it also is generated for a longer period of time and thus in greater volume. This excess, early steam generated in the first ingredient layer cannot all travel to the central aperture for venting, and can cause a doming effect in the second dough layer. Unattractive bubbling, blistering, and doming in the second dough layer can cause redistribution of the toppings on the second dough layer, even to the point where the toppings slide completely off the pizza. Similar results occur when the first ingredient layer includes food products that have a moisture content that is too high.

Therefore, a need has arisen to prevent distortion to the top dough layer and the second ingredient layer caused by steam generated in the first ingredient layer.

BRIEF DESCRIPTION OF THE DRAWINGS

Embodiments of the invention will be described with reference to the Figures, in which like reference numerals denote like elements and in which:

FIG. 2 is a side view of the FIG. 1 dough punch;

FIG. 3 is a top view of the FIG. 1 dough punch, with the top portion closed;

FIG. 4 is a bottom view of the FIG. 1 dough punch;

FIG. 5 is a side, cross-sectional view of the FIG. 1 dough punch; and

FIG. 6 is a partial cross-sectional view of the FIG. 1 dough punch perforating a sheet of dough.

DETAILED DESCRIPTION OF PREFERRED EMBODIMENTS

Figure 1:
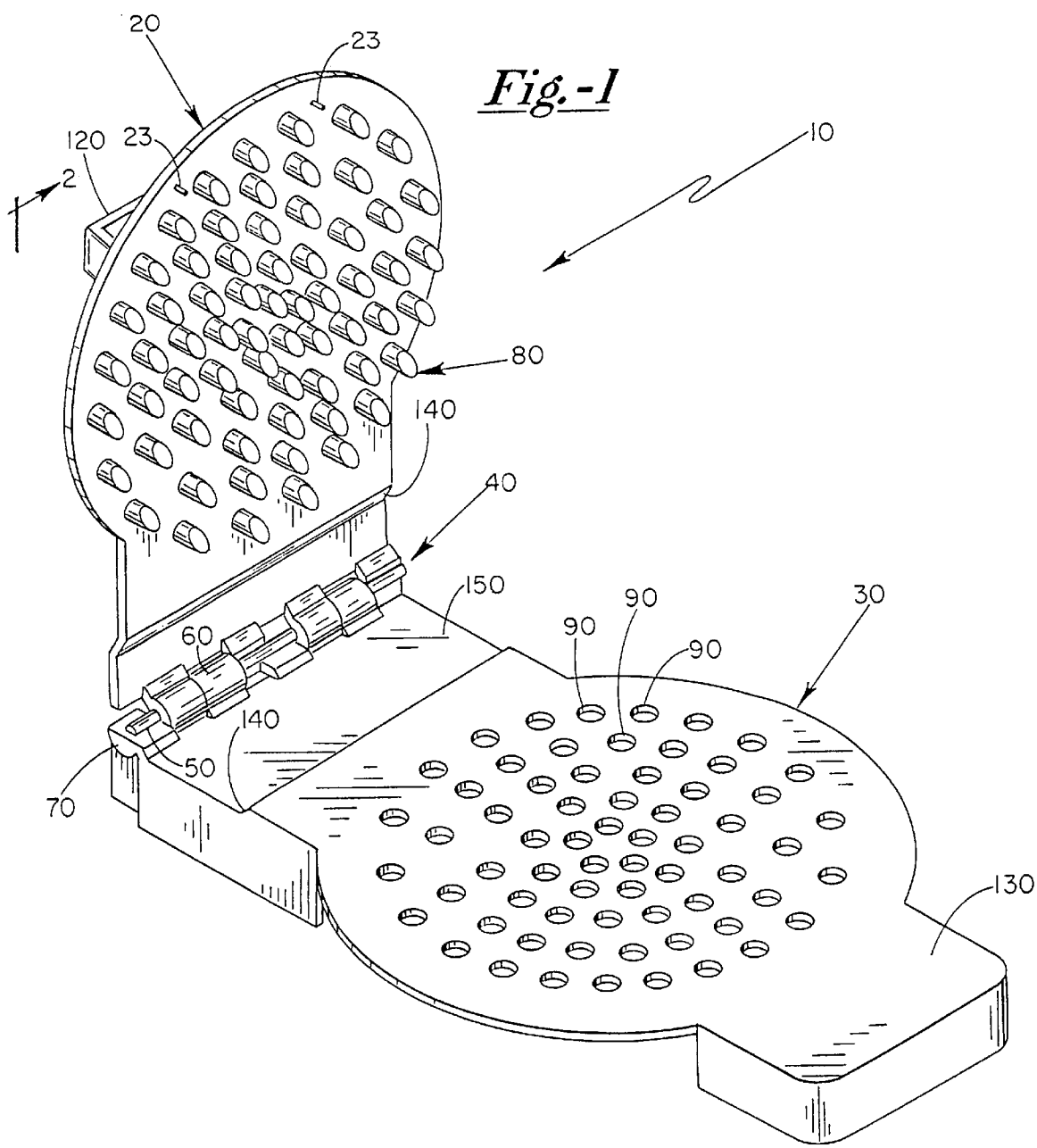
FIG. 1 is a perspective view of a dough punch according to an embodiment of the invention.

Preferred embodiments of the invention are directed toward an apparatus and method for punching multiple holes in a sheet of pizza dough, to allow steam from an underlying food layer to escape through the sheet of dough. Various other applications will be apparent to those of ordinary skill, however. The holes created in the dough sheet can be for another purpose, for example allowing food ingredients to drain or otherwise pass between layers of a pizza product. Further, embodiments of the invention will have application to food and dough products other than pizza products. Other alternatives will be readily apparent to those of ordinary skill.

FIG. 1 shows a dough punch according to a preferred embodiment. Dough punch 10 includes perforating top portion 20 and base portion 30, both of which are preferably formed in a substantially circular shape, as shown. Of course, other shapes, such as rectangular or square shapes, can also be used. A preferred embodiment includes a substantially circular shape, however, because the dough sheets to be punched are generally circular. As shown in e.g. FIG. 3, top portion 20 is of slightly smaller diameter than base portion 30, creating an underlap 25 substantially entirely around dough punch 10. This saves materials and thus reduces costs. Alternatively, top portion 20 can be the same size as or larger than base portion 30.

Top portion 20 is pivotally connected to base portion 30 by hinge mechanism 40. Hinge mechanism 40 includes hinge rod 50, removably inserted through a plurality of interlocking ears 60 and non-pivotally engaged on rod rest 70. Hinge rod 50 preferably is of substantially cylindrical shape and preferably sits within a substantially half-circular recess in rod rest 70. Alternatively, hinge rod 50 can be of substantially half-circular shape in cross-section, to present a lower flat surface that faces and engages an upper flat surface of rod rest 70. In either case, hinge rod 50 can be easily withdrawn from ears 60, allowing top and base portions 20, 30 to be separated and placed in a dishwasher, for example.

Top portion 20 of dough punch 10 supports a plurality of punch pins 80, which preferably are disposed perpendicular to a lower surface of top portion 20. Holes 90 of base portion 30 receive pins 80 to perforate dough sheet 100 (FIG. 6), as will be described below. As shown in FIG. 2, top portion 20 pivots on hinge mechanism 40 along path 110, until pins 80 are received in holes 90. Spacers 23 keep the tip of top portion 20 a desired distance from base portion 30, as shown in FIG. 6, for example. Alternatively, spacers 23 can be eliminated, as the spacing between top and base portions 20, 30 is relatively minimal in the first instance.

To aid in the cutting process, pins 80 include an angled blade portion 83, ending in a tip portion 85. Tip 85 of each pin 80 first engages dough sheet 100 at a single point, to allow easy blade penetration of dough sheet 100. As top portion 20 further descends along path 110, blade 83 of each pin 80 tears or penetrates dough sheet 100 in a radial direction with respect to each pin 80, to create a plurality of holes in dough sheet 100.

The shape of blade 83 is advantageously designed to require minimal downward pressure on top portion 20 to create the holes in the dough sheet. Other shapes are also possible, for example a blunt/rounded mushroom shape, a cone shape, square, triangular and other polygonal shapes, or a shape having two tips 85 that are diametrically opposed to each other to form a V-shaped groove in cross-section, to name a few specific examples. An outwardly directed V-shape, with a square or cylindrical pin 80, also can be used. The illustrated blade shape is especially desirable, however, to reduce the amount of pressure that must be applied to top portion 20 in creating the holes. Blunt-nosed pins, for example, require an unacceptably high amount of pressure to be applied on top portion 20 to push all of the pins through dough sheet 100.

Pins 80 are held to top portion 20 by a plurality of screws, rivets or similar fasteners 87, or by adhesive or ultrasonic welding, for example. Screws 87 with threads 89 (FIG. 6) are particularly advantageous, because damaged pins 80 can be readily removed and replaced. Pins 80 can also be molded to top portion 20, although this is not as desirable an arrangement because adequate alignment of pins 80 with holes 90 is more difficult to achieve.

Each hole 90 in base portion 30 is downwardly chamfered, as shown at 95 in FIG. 6, for example. Chamfers 95 allow easy dislodgement of waste dough bits 105 from holes 90. Blade portion 83 of each pin 80 clears at least the beginning of chamfered portion 95 of each hole 90, for the best cutting effect. As shown in the illustrated embodiment, blades 83 clear not only chamfers 95 but also the entire bottom surface of base portion 30. This ensures that dough bits 105 are entirely separated from dough sheet 100 and do not remain partially attached to create a flap. Flapped holes, instead of completely open holes, are undesirable because the flaps have the potential to re-seal to the remainder of dough sheet 100 or at least block holes 90.

Dough punch 10 preferably includes handle 120 to allow easy grasping by a user for movement along path 110. According to a preferred embodiment, a user of dough punch 10 pushes down on top portion 20 with one hand on handle 120 and another hand directly on top portion 20, applying downward pressure to create the holes in the dough sheet. Dough punch 10 also advantageously includes handle portion 130, extending from the substantially circular edge of base portion 30, to allow easier grasping by a user during transport of dough punch 10 from one location to another.

Top and base portions 20, 30 each include ramped surfaces 140, leading to recessed portions 150. When top and base portions 20, 30 are closed together, recessed portions 150 create gap 155 (FIG. 5). Gap 155 acts as a relief point for excess dough extending from the center of base portion 30 back toward hinge mechanism 40.

As shown in FIG. 3, pins 80 are disposed on top portion 20 in a series of five concentric rings 101, 103, 105, 107 and 109. Dough punch 10 thus creates a substantially uniform hole pattern in dough sheet 100, allowing even venting of steam from underneath the dough layer in an assembled pizza product without undesirable bubbling or blistering. According to the illustrated embodiment, inner ring 101 includes five pins 80, the next ring 103 includes nine pins, ring 105 includes thirteen pins, ring 107 includes seventeen pins, and ring 109 includes twenty-one pins, for a total of sixty-five pins. Thus, each of the outer rings 103, 105, 107 and 109 includes four pins more than its most immediate inwardly disposed ring. This number of pins has been shown to work extremely well with a 12-inch pizza product. Of course, for different applications, for example different pizza diameters, different numbers of holes and different hole patterns can be used.

Dough punch 10 is supported on a table or other underlying surface 200 by a plurality of feet 180. Feet 180 are preferably formed of a substantially compressible material, such as rubber, to allow slight downward movement of dough punch 10 against table 200 when downward pressure is applied to create holes in dough sheet 100. As shown in FIG. 6, when the user applies downward pressure to the top surface of top portion 20, feet 180 will compress slightly. This compression allows skirt 210 and rigid standoffs 190, secured to base portion 30, to engage table 200 and provide counterpressure. When dough punch 10 is in the opened position (e.g. FIG. 2), on the other hand, skirt 130 and standoffs 190 do not engage underlying surface 200, according to a preferred embodiment. (The gap between underlying surface 200 and skirt 130/standoffs 190 as illustrated in e.g. FIG. 2 is not necessarily to scale.) Standoffs 190 may also be higher than feet 180 relative to table 800 by the amount of thickness of a typical pizza pan, to allow the pan to be placed under dough punch 10 to catch dough bits 105.

It is desirable to remove a significant amount of material from dough sheet 100, instead of just creating slits or other insubstantial openings. Slits or other small openings would have a tendency to re-seal in dough sheet 100, trapping steam underneath the dough sheet during the cooking process and creating the associated problems described above. According to a preferred embodiment, pins 80 create holes in dough sheet 100 of approximately one-half inch diameter at a density of approximately one hole per 1.75 square inches of dough sheet 100. Smaller holes, for example, one-quarter inch diameter holes, have a tendency to seal up after the dough is removed from dough punch 10, as described above. Circumferential inter-hole spacing is approximately 1.5 inches, and ring-to ring spacing is approximately 1.25 inches, according to a preferred embodiment. Of course, other hole diameters and spacings also can be used, depending for example on the type of dough to be used. Dough bits 105 are completely separated from dough sheet 100, as shown in FIG. 6.

As dough punch 10 creates the holes in dough sheet 100, the dough immediately around each created hole is crimped together, to prevent dough sheet 100 from separating into a plurality of different layers. Creating holes with punch 10 thus achieves advantages similar to those achieved by docking dough with a plurality of pin-sized holes, but without the need for manually rolling a typical dough docking tool around the dough. Of course, both manual docking and punching with dough punch 10 can occur during preparation of a pizza product, if desired.

According to a prefer red embodiment, dough punch 10 is used to punch only one dough sheet 100 at a time. Perforating multiple dough sheets simultaneously tends to knit the dough sheets together, because pins 80 press the upper dough sheet into the lower dough sheet before achieving the cutting interaction between blade 83 and hole 90. Multiple dough sheets are thus in effect melded together, and in separating the dough sheets damage occurs to both the dough sheets and the holes created in them. For some types of applications, however, for example for relatively stiff doughs, multiple sheets can successfully be punched.

Dough punch 10 can be formed of a number of different materials, for example polycarbonate and polyester thermoplastics and other such materials. Materials that are relatively rugged and stand up to chemical attack and elevated temperatures, for example in dishwasher environments, are preferable.

While the invention has been described with reference to specific embodiments, the description is illustrative and is not to be construed as limiting the scope of the invention. According to the invention, a wide variety of dough punching devices are discernable. Various modifications and changes will occur to those skilled in the art without departing from the spirit and scope of the invention.

What is claimed is:

1. An apparatus for producing a plurality of openings in a dough layer, the apparatus being constructed to rest on an underlying surface, the apparatus comprising:
   a top portion, the top portion including an exterior surface of the apparatus;
   a plurality of pins supported by the top portion and substantially rigidly fixed with respect to the top portion, the plurality of pins being arranged in a fixed pattern;
   a base portion, the base portion defining a plurality of holes extending therethrough, the base portion holes being arranged in a fixed pattern corresponding to the fixed pattern of the plurality of pins supported by the top portion, the base portion being constructed to receive and support a dough layer over the plurality of holes;
   supporting structure for supporting the apparatus on the underlying surface; and
   structure, operably connected to at least the top portion, to lower the top portion toward the base portion, the lowering of the top portion toward the base portion urging the pins of the top portion through the dough layer and then into the holes of the base portion to create a plurality of openings in the dough layer in a single continuous motion by separating waste dough bits from the dough layer, the dough bits passing through the plurality of holes and then being free to fall directly to the underlying surface on which the apparatus rests.

2. The apparatus of claim 1, wherein the structure to lower the top portion toward the base portion includes a hinge connecting the top portion and the base portion, the hinge causing the pins of the top portion to move into the holes of the base portion.

3. The apparatus of claim 2, wherein the structure to lower the top portion toward the base portion further includes a handle on the top portion.

4. The apparatus of claim 1, wherein the pins each include an angled blade portion having a tip, the tip being constructed to first engage the dough layer at a single point on a circumferential side of the tip.

5. The apparatus of claim 4, wherein the pins are constructed to perforate the dough layer radially with respect to the pins and to completely separate waste dough bits from the dough layer to create the openings in the dough layer.

6. The apparatus of claim 1, wherein the holes of the base portion are downwardly chamfered to aid in the removal of waste dough bits from the dough layer.

7. The apparatus of claim 1, wherein one or more of the top and base portions include structure defining a gap for accommodating excess dough of the dough layer.

8. The apparatus of claim 1, wherein the fixed pattern of pins and the corresponding fixed pattern of holes each include a plurality of concentric rings of pins and holes, respectively.

9. The apparatus of claim 1, wherein the top portion is manually lowered toward the base portion.

10. The apparatus of claim 1, wherein the base portion is supported by a plurality of feet.

11. The apparatus of claim 10, wherein the feet are compressible.

12. The apparatus of claim 1, wherein the base portion defines an area of contact with the dough layer, further wherein the base portion is constructed such that the entire area of contact of the dough with the base portion, and the dough layer, are generally planar.

13. The apparatus of claim 1, wherein the structure to lower the top portion toward the base portion includes a handle on the top portion.

14. A method of creating a plurality of openings in a dough layer using an apparatus for creating the openings, the apparatus being constructed to rest on an underlying surface, the method comprising:
   (a) placing a dough layer on a base portion of the apparatus, the base portion having a plurality of holes extending therethrough in a fixed pattern;
   (b) pivoting a top portion of the apparatus toward the base portion, the top portion supporting a plurality of pins in a fixed pattern; and
   (c) receiving the plurality of pins in the plurality of holes, the pins passing into the dough layer to create a plurality of openings in the dough layer by separating waste dough bits from the dough layer, the dough bits passing through the plurality of holes and then being free to fall directly to the underlying surface on which the apparatus rests, wherein (b) and (c) occur in a single continuous motion.

15. The method of claim 14, wherein step (b) includes swinging the top portion toward the base portion by a hinge connecting the top and base portions.

16. The method of claim 14, wherein each pin has a beveled tip defining a plane, and step (c) includes:
   engaging the dough layer with each pin at a point on the outer circumference of the pin, and then
   penetrating the dough layer with the pin such that the area of contact between the pin and the dough layer moves across the beveled tip in the plane.

17. The method of claim 14, wherein step (b) includes manually lowering the top portion toward the base portion.

18. An apparatus for producing a plurality of openings in a dough layer, the apparatus being constructed to rest on an underlying surface, the apparatus comprising:
   a top portion;
   a plurality of pins supported by the top portion, the plurality of pins being arranged in a fixed pattern;
   a base portion, the base portion defining a plurality of holes extending therethrough, the base portion holes being arranged in a fixed pattern corresponding to the fixed pattern of the plurality of pins supported by the top portion, the base portion being constructed to receive and support a dough layer over the plurality of holes, the base portion comprising at least one compressible foot and at least one standoff, the foot and standoff being constructed to support the base on an underlying surface; and
   structure, operably connected to at least the top portion, to lower the top portion from a raised position toward the base portion and into a lowered position, and to guide the pins of the top portion through the dough layer and into the holes of the base portion to create a plurality of openings in the dough layer;

wherein moving the top portion to its lowered position compresses the foot and consequently causes the standoff to move into engagement with the underlying surface.

19. The apparatus of claim 18, wherein the underlying surface includes a pan, the standoff being constructed to engage the pan when the top portion is in its lowered position.

20. An apparatus for producing a plurality of openings in a dough layer, the apparatus comprising:

a top portion;

a plurality of pins supported by the top portion, the plurality of pins being arranged in a fixed pattern, the plurality of pins each being downwardly chamfered to a point, said point being offset to one edge of said pins to form a single bevel to aid in the dough-cutting process, said dough-cutting process commencing at said offset point of said pins and proceeding circumferentially around the bevel of each pin until waste dough bits are removed from the dough layer;

a base portion, the base portion defining a plurality of holes extending therethrough, the base portion holes being arranged in a fixed pattern corresponding to the fixed pattern of the plurality of pins supported by the top portion, the base portion being constructed to receive and support a dough layer over the plurality of holes; and structure, operably connected to at least the top portion, to lower the top portion toward the base portion and to guide the pins of the top portion through the dough layer and then into the holes of the base portion to create a plurality of openings in the dough layer.

21. An apparatus for producing a plurality of openings in a dough layer, the apparatus being constructed to rest on an underlying surface, the apparatus comprising:

a top portion;

a plurality of pins supported by the top portion, the plurality of pins being arranged in a fixed pattern;

a base portion, the base portion defining a plurality of holes extending therethrough, the base portion holes being arranged in a fixed pattern corresponding to the fixed pattern of the plurality of pins supported by the top portion, the base portion being constructed to receive and support a dough layer over the plurality of holes; and structure, operably connected to at least the top portion, to lower the top portion toward the base portion and to guide the pins of the top portion through the dough layer and then into the holes of the base portion to create a plurality of openings in the dough layer by separating waste dough bits from the dough layer, the dough bits passing through the plurality of holes and then being free to fall directly to the underlying surface on which the apparatus rests;

wherein the pins each include an angled blade portion having a tip, the tip being constructed to first engage the dough layer at a single point on a circumferential side of the tip.

22. A method of creating a plurality of openings in a dough layer using an apparatus for creating the openings, the apparatus being constructed to rest on an underlying surface, the method comprising:

(a) placing a dough layer on a base portion of the apparatus, the base portion having a plurality of holes extending therethrough in a fixed pattern;

(b) lowering a top portion of the apparatus toward the base portion, the top portion supporting a plurality of pins in a fixed pattern; and (c) receiving the plurality of pins in the plurality of holes, the pins passing into the dough layer to create a plurality of openings in the dough layer by separating waste dough bits from the dough layer, the dough bits passing through the plurality of holes and then being free to fall directly to the underlying surface on which the apparatus rests;

wherein (c) further includes:

engaging the dough layer with each pin at a point on the outer circumference of the pin, and then penetrating the dough layer with the pin such that the area of contact between the pin and the dough layer moves across the beveled tip in the plane.

* * * * *